Sept. 21, 1926.

J. STREMEL

OBSTRUCTION REMOVER

Filed Dec. 21, 1925

1,600,373

Inventor
Joseph Stremel

By Herbert E. Smith
Attorney

Patented Sept. 21, 1926.

1,600,373

UNITED STATES PATENT OFFICE.

JOSEPH STREMEL, OF EVERETT, WASHINGTON, ASSIGNOR OF ONE-HALF TO NICHOLAS SCHOMMERS, OF SPOKANE, WASHINGTON.

OBSTRUCTION REMOVER.

Application filed December 21, 1925. Serial No. 76,829.

My present invention relates to improvements in obstruction removers for use by plumbers and others in clearing pipes of obstructions, and opening the way therethrough for passage of sewerage. For this purpose it is customary to employ a flexible tube or tool for insertion into the clogged pipe, and one form of flexible tube as thus used is a closely wound coiled spring with a cutting tool or reamer at its working end and an operating head at the other end that is manually controlled. The working or cutting end of the tool is introduced into a pipe to be cleared and the tool is advanced to the obstruction by turning or twisting to impart a screw action to the tool within the pipe and to impart a rotary cutting action to the cutter at the working end of the tool. The flexibility of the tool permits it to pass through bends, joints and other elements of the tortuous passage in the pipe. After the obstruction has been cleared away the tool is withdrawn by pulling it from the pipe. Frequently the tool becomes jammed in the tortuous passages of the pipe and cannot be withdrawn except by excessive pressure or pulling force. If the flexible tube is firmly held or jammed in the pipe, the application of pulling force in many instances is so great as to break the tool or coiled spring leaving a portion of it in the pipe and resulting in expensive operations to accomplish the removal of the broken part.

The primary object of my invention is the provision of means in connection with the flexible tube or closely wound coiled spring which will strengthen the tube and bear the strain of applied pulling force when the tool is being removed from the pipe, thus relieving the flexible tube and eliminating danger of breakage.

The invention consists in certain novel combinations and arrangements of parts involved in the use of a pull cord or cable extended between the working head and operating head of the tool and located within the flexible tool, as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

The flexible tube of the tool is shown as a closely wound spirally arranged wire or coiled spring 1 which of course is flexible and capable of being passed through the tortuous passages in a sewerage pipe in a dwelling or other building structure, and possesses sufficient rigidity when confined within the pipes to transmit rotary movement throughout its length to the working end of the tool when the latter is operated by power applied to operating end.

Figure 1:
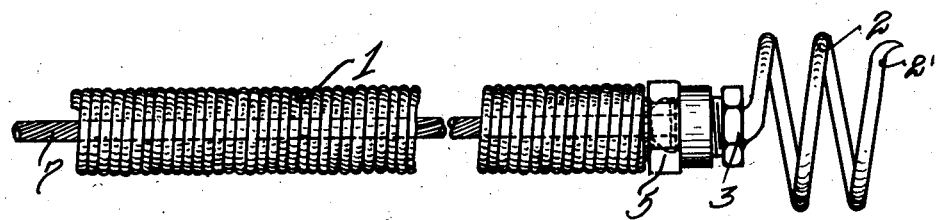
Figure 1 is a view at the working end of the tool showing the cutter and cutter head, with parts broken away.
Figure 2:
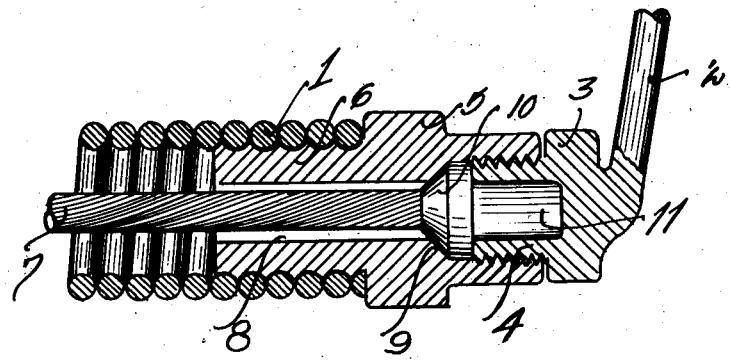
Figure 2 is an enlarged detail sectional view of the rotary cutter head.

As shown in Figure 1 the flexible tool is of considerably less diameter than the interior of the pipe in which it is to be used and of less diameter than the rotary cutter 2 at the working end of the tool. This cutter as shown in Figure 1 is in the form of a helical wire with a sharp point 2' for engagement with an obstruction in the pipe and by rotary movement of the cutter the obstruction is cut away and the débris cleared away.

The rotary cutting tool is carried by a cutter head 3 which is fashioned with an exterior threaded sleeve 4 which is threaded into a tool-head 5. The tool-head is fashioned with a sleeve 6 having exterior spiral grooves in which the working end of the flexible tool is firmly secured back of the enlarged portion of the tool head. The reinforcing element of the tool comprises a metal cable or cord 7 which of course is flexible and is located within the flexible tube or tool 1. The end of the cable passes through a longitudinal opening 8 in the tool head and this opening terminates in a tapered seat 9 in the head. The end of the cable 7 is fashioned with a complementary head 10 that fits in the seat of the tool head, and a stem 11 of the cable-head is used as a guide and support for centering the threaded sleeve 4 of the cutter head.

By screwing the cutter head into the tool head and over the stem of the cable head it will be apparent that the cutter head is fixed in operative position, the cable is anchored to the tool head and the entire working end of the flexible tool is fashioned as a unit to be revolved or rotated by rotary movement transmitted to the flexible tool.

The cutter or reamer 2 is advanced to its work by twisting or turning the flexible tool 1 and its working head for cutting away the obstruction, and after this operation the flexible tool is withdrawn from the pipe. The pull on the tool is received principally by the cable 7 and imparted to the enclosing flexible tube through the cable head and tool head, and in this manner the tool may be withdrawn without danger of breaking the flexible tube or tool.

Having thus fully described my invention what I claim as new and desire to secure by Letters Patent is—

1. The combination with a tool head and its flexible tube, of a cable within the tube, a tapered head on the cable seated in the tool head, a guide stem on the cable-head, a cutter head having a sleeve threaded into said tool head and fitting over said stem, and a cutter carried by said cutter head.

2. The combination with a tool head having an elongated body provided with a central bore extending longitudinally therethrough and a flexible tube, of a cable disposed within the tube and passed through the bore of said tool head, a tapered head on said cable seated in said tool head at one end of the bore, an extension on said tool head formed with a socket, and a cutter secured in said socket and retaining said cable head against its seat.

In testimony whereof I affix my signature.

JOSEPH STREMEL.